(12) United States Patent
Claes (10) Patent No.: US 11,175,453 B2
(45) Date of Patent: Nov. 16, 2021

(54) PHOTONIC CIRCUIT WITH INTEGRATED LIGHT COUPLER

(71) Applicants: IMEC VZW, Leuven (BE); Samsung Electronics Co. Ltd., Gyeonggi-do (KR)

(72) Inventor: Tom Claes, Merelbeke (BE)

(73) Assignees: IMEC VZW, Leuven (BE); Samsung Electronics Co., Ltd., Gyeonggi-do (KR)

( * ) Notice: Subject to any disclaimer, the term of this patent is extended or adjusted under 35 U.S.C. 154(b) by 463 days.

(21) Appl. No.: 16/326,504

(22) PCT Filed: Aug. 18, 2017

(86) PCT No.: PCT/EP2017/070955
§ 371 (c)(1),
(2) Date: Feb. 19, 2019

(87) PCT Pub. No.: WO2018/033633
PCT Pub. Date: Feb. 22, 2018

(65) Prior Publication Data
US 2021/0294034 A1   Sep. 23, 2021

(30) Foreign Application Priority Data
Aug. 19, 2016 (EP) .................................... 16184949

(51) Int. Cl.
G02B 6/122 (2006.01)
G01J 3/18 (2006.01)
G01J 3/02 (2006.01)

(52) U.S. Cl.
CPC ............ *G02B 6/1228* (2013.01); *G01J 3/021* (2013.01); *G01J 3/1895* (2013.01); *G01J 3/0259* (2013.01)

(58) Field of Classification Search
CPC ...... G02B 6/1228; G01J 3/021; G01J 3/1895; G01J 3/0259
See application file for complete search history.

(56) References Cited

U.S. PATENT DOCUMENTS

| 4,815,843 A | 3/1989 | Tiefenthaler et al. |
| 6,226,083 B1 | 5/2001 | Schwerzel et al. |
| (Continued) | | |

FOREIGN PATENT DOCUMENTS

| EP | 2634605 A1 | 9/2013 |
| WO | 2015/139200 A1 | 9/2015 |
| (Continued) | | |

OTHER PUBLICATIONS

Guldimann,"Focal plane array spectrometer miniaturization effort for space optical instruments",2011, SPIE (Year: 2011).*

(Continued)

*Primary Examiner* — Maurice C Smith
(74) *Attorney, Agent, or Firm* — McDonnell Boehnen Hulbert & Berghoff LLP (57) ABSTRACT

An integrated photonic device may include an image detector that comprises an array of pixels. The device may further include an integrated waveguide and a light coupler comprising a light receiving part optically coupled to the integrated waveguide for receiving a light signal. The light coupler may be adapted for coupling a same predetermined spectral band of the light signal to each of a plurality of pixels of the image detector. The light coupler may include a tapered portion, in which the light coupler tapers outward in a direction of propagation, and an end part comprising an elliptically shaped back reflector for reflecting light propagating along the direction of propagation back through the light coupler toward the integrated waveguide.

20 Claims, 6 Drawing Sheets

(56) References Cited

U.S. PATENT DOCUMENTS

2005/0286832 A1 12/2005 Witzens et al.
2014/0319378 A1 10/2014 Van Steenberge et al.
2015/0141267 A1 5/2015 Rothberg et al.
2015/0168217 A1 6/2015 Englund et al.
2015/0285996 A1 10/2015 Selvaraja

FOREIGN PATENT DOCUMENTS

WO 2016/039690 A1 3/2016
WO 2016/107849 A1 7/2016

OTHER PUBLICATIONS

E Zgraggen, "Optical properties of waveguide-coupled nanowires for sub-wavelength detection in microspectrometer applications", Nov. 2014 (Year: 2014).*
PCT International Search Report and Written Opinion, PCT International Application No. PCT/EP2017/070955, dated Nov. 24, 2017, 15 pages.

* cited by examiner

PHOTONIC CIRCUIT WITH INTEGRATED LIGHT COUPLER

CROSS-REFERENCE TO RELATED APPLICATIONS

The present application is a national stage entry of PCT/EP2017/070955, filed Aug. 18, 2017, which claims priority to EP16184949.2 filed on Aug. 19, 2016, the contents of each of which are hereby incorporated by reference.

FIELD OF THE DISCLOSURE

The present disclosure relates to the field of photonic integrated circuits. More specifically, it relates to an integrated photonic device, and related method, by which a light signal can be coupled from an integrated waveguide to an image detector.

BACKGROUND

In integrated photonic devices known in the art, such as integrated spectrometers, a photonic circuit may be provided on an image detector. For example, a plurality of grating couplers may couple light from a waveguide towards an image detector for detection.

For example, U.S. Pat. No. 6,226,083 discloses an integrated-optic spectrometer for analyzing the composition of light reflected off a sample under analysis. The integrated-optic spectrometer comprises a waveguide, fabricated onto an oxidized substrate, an array of diffraction gratings, and a detector array. The detector array is mounted on the waveguide so as to receive the light of different wavelengths diffracted by the grating array, e.g., such as to enable the analysis of different discrete wavelengths. The diffraction gratings each comprise a series of grating lines and are constructed to provide transmission of wavelengths not diffracted by the diffraction grating. The input light is guided through the waveguide, and discrete wavelengths are diffracted by the diffraction gratings onto the photodiode detector array, which in turn measures the intensity of the light at the discrete wavelengths for determining composition, while transmitting non-diffracted wavelengths through the waveguide.

In such a prior-art system, the diffraction gratings may have the shape of a square or rectangle, with grating lines at right angles to the direction of propagation of light within the waveguide, resulting in the light being coupled out of the waveguide in a direction that is about perpendicular to the plane of the waveguide, e.g., toward the photodiode detector array.

However, it is a disadvantage of such prior-art systems that each grating coupler may typically have a low out-coupling efficiency. Furthermore, this may adversely affect the signal-to-noise ratio for the signal detected by the individual pixels. It is known that, in order to increase the coupling efficiency of a grating coupler, its length may be increased. However, this implies that also the photodiode detector array should be chosen such that the individual detector pixel elements of the array are sufficiently large, e.g., such that the length of the gratings about matches the pixel pitch. This may put large constraints on the choice of imager from commercially available imaging solutions, or might even require the development of expensive custom arrays.

Means for out-coupling light from integrated waveguides, other than grating couplers, may also be known in the art, some of which may be able to achieve a higher efficiency. However, grating couplers are well-studied and predictable, easy to implement, cheap to manufacture, and/or easy to integrate in a device. Furthermore, given the low complexity of a grating coupling, it may be easier to scale to smaller sizes than other light-coupling means known in the art.

SUMMARY OF THE INVENTION

Some embodiments of the present disclosure may provide improved coupling of light from an integrated waveguide to an image detector.

This may be accomplished by a method and device according to the present disclosure.

In some embodiments of the present disclosure, efficiency of light detection may be increased, e.g., relative to a prior art integrated photonic device for coupling light from a waveguide to an image detector.

In some embodiments of the present disclosure, noise, such as dark current and read noise, generated in quantifying a light signal, e.g., in spectral analysis of the light signal, can be reduced.

In a first aspect, the present disclosure relates to an integrated photonic device. This integrated photonics device comprises an image detector that comprises an array of pixels, an integrated waveguide, and a light coupler. The light coupler comprises a light receiving part that is optically coupled to the integrated waveguide for receiving a light signal. The light coupler is furthermore adapted for coupling a same predetermined spectral band of the light signal to each of a plurality of pixels of the image detector. The light coupler comprises a tapered portion in which the light coupler tapers outward in a direction of (light) propagation. The light coupler comprises an end part at an end of the light coupler opposite of the light receiving part, such that the direction of propagation extends from the light receiving part to the end part. The end part further comprises an elliptically shaped back reflector for reflecting light propagating along the direction of propagation back through the light coupler toward the integrated waveguide.

In an integrated photonic device in accordance with embodiments of the present disclosure, the light coupler may comprise a diffraction grating.

In an integrated photonic device in accordance with embodiments of the present disclosure, the light coupler may comprise a plurality of diffraction gratings spaced apart by light guiding segments, in which each diffraction grating is adapted for supplying an active pixel area of a corresponding pixel of the plurality of pixels with the same predetermined spectral band of the light signal.

In an integrated photonic device in accordance with embodiments of the present disclosure, each of the light guiding segments may be adapted for guiding the light signal between an adjacent pair of the diffraction gratings without thereby diffracting light out of the light guiding segment.

In an integrated photonic device in accordance with embodiments of the present disclosure, the light coupler may be arranged above an imaging plane of the image detector. The light coupler may furthermore be adapted for directing the predetermined spectral band toward the plurality of pixels in a substantially perpendicular direction with respect to the imaging plane.

In an integrated photonic device in accordance with embodiments of the present disclosure, the light coupler may have a length that is at least two times the pixel pitch of the image detector.

In an integrated photonic device in accordance with embodiments of the present disclosure, the length of the light coupler may be in the range of 75% to 125% of the total length of the plurality of pixels.

In an integrated photonic device in accordance with embodiments of the present disclosure, the plurality of pixels may comprise at least three pixels.

In an integrated photonic device in accordance with embodiments of the present disclosure, the plurality of pixels may comprise at least four pixels.

In an integrated photonic device in accordance with embodiments of the present disclosure, the integrated waveguide and the light coupler may be integrated on the image detector. For example, the integrated waveguide and the light coupler may be monolithically integrated on the image detector. For example, the integrated waveguide and the light coupler may be integrated on the image detector by heterogeneous integration.

An integrated photonic device in accordance with embodiments of the present disclosure may further comprise a top reflector that covers a side of the light coupler opposite of the side to which the image detector is located. The top reflector may be arranged at a predetermined distance from the light coupler at this side opposite of the side to which the image detector is located.

An integrated photonic device in accordance with embodiments of the present disclosure may comprise a plurality of integrated waveguides and a plurality of light couplers for coupling light from a corresponding integrated waveguide toward the image detector.

In an integrated photonic device in accordance with embodiments of the present disclosure, each of the light couplers may be adapted for coupling a different predetermined spectral band of the light signal to the corresponding plurality of pixels of the image detector.

In an integrated photonic device in accordance with embodiments of the present disclosure, the at least one pair of light couplers from the plurality of light couplers may be arranged such as to have adjacent end parts. This pair of light couplers may comprise a common back reflector for reflecting light propagating along the direction of propagation in each of the pair of light couplers back along the inverse direction of propagation.

In another aspect, the present disclosure also relates to a spectrometer comprising an integrated photonic device according to embodiments of the first aspect of the present disclosure.

In another aspect, the present disclosure also relates to a method for analyzing a spectral band of a light signal. The method comprises coupling the light signal into an integrated light coupler that comprises a tapered portion, in which the light coupler tapers outward in a direction of (light) propagation, and an end part comprising an elliptically shaped back reflector for reflecting light propagating along the direction of propagation back through the light coupler. The method further comprises, using the light coupler, diffracting the spectral band of the light signal out of the light coupler, in a plurality of discrete out-coupling regions, toward active areas of a corresponding plurality of pixels of an image detector, while guiding the light signal between each adjacent pair of the out-coupling regions such as to avoid diffracting light out of the light coupler toward light insensitive areas of the image detector.

In a method in accordance with embodiments of the present disclosure, the step of diffracting may comprise supplying an active pixel area of a pixel of the plurality of pixels with the same predetermined spectral band of the light signal via a corresponding diffraction grating of a plurality of diffraction gratings of the light coupler, in which the diffraction gratings are spaced apart by light guiding segments.

A method in accordance with embodiments of the present disclosure may comprise guiding the light signal between an adjacent pair of the diffraction gratings without thereby diffracting light out of the light guiding segment.

A method in accordance with embodiments of the present disclosure may comprise coupling the light signal into a plurality of integrated waveguides comprising a corresponding plurality of light couplers for coupling light from each integrated waveguide toward the image detector.

A method in accordance with embodiments of the present disclosure may comprise reflecting light propagating along a direction of propagation in each of a pair of the light couplers back along the inverse direction of propagation using a common back reflector, in which the pair of light couplers is arranged such as to have adjacent end parts, and in which the pair of light couplers comprises a common back reflector, e.g., a shared back reflector structure, that forms the elliptically shaped back reflector of both the light couplers of said pair, e.g., the common back reflector may have a first elliptically shaped surface for reflecting light propagating through the first light coupler of the pair of light couplers and may have a second elliptically shaped surface for reflecting light propagating through the second light coupler of the pair of light couplers.

Particular aspects of the disclosure are set out in the accompanying independent and dependent claims. Features from the dependent claims may be combined with features of the independent claims and with features of other dependent claims as appropriate and not merely as explicitly set out in the claims.

These and other aspects of the disclosure will be apparent from and elucidated with reference to the embodiment(s) described hereinafter.

The drawings are only schematic and are non-limiting. In the drawings, the size of some of the elements may be exaggerated and not drawn to scale for illustrative purposes.

Any reference signs in the claims shall not be construed as limiting the scope.

In the different drawings, the same reference signs refer to the same or analogous elements.

DETAILED DESCRIPTION

The present disclosure will be described with respect to particular embodiments and with reference to certain drawings, but the disclosure is not limited thereto but only by the claims. The drawings described are only schematic and are non-limiting. In the drawings, the size of some of the elements may be exaggerated and not drawn to scale for illustrative purposes. The dimensions and the relative dimensions do not correspond to actual reductions to practice of the disclosure.

Furthermore, the terms first, second and the like in the description and in the claims, are used for distinguishing between similar elements and not necessarily for describing a sequence, either temporally, spatially, in ranking, or in any other manner. It is to be understood that the terms so used are interchangeable under appropriate circumstances and that the embodiments of the disclosure described herein are capable of operation in other sequences than described or illustrated herein.

Moreover, the terms top, under, and the like in the description and the claims are used for descriptive purposes and not necessarily for describing relative positions. It is to be understood that the terms so used are interchangeable under appropriate circumstances and that the embodiments of the disclosure described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps, or components as referred to, but does not preclude the presence or addition of one or more other features, integers, steps, or components, or groups thereof. Thus, the scope of the expression "a device comprising components A and B" should not be limited to devices consisting only of components A and B. It means that with respect to the present disclosure, the only relevant components of the device are A and B.

Reference throughout this specification to "one embodiment" or "an embodiment" means that a particular feature, structure, or characteristic described in connection with the embodiment is included in at least one embodiment of the present disclosure. Thus, appearances of the phrases "in one embodiment" or "in an embodiment" in various places throughout this specification are not necessarily all referring to the same embodiment, but may. Furthermore, the particular features, structures, or characteristics may be combined in any suitable manner, as would be apparent to one of ordinary skill in the art from this disclosure, in one or more embodiments.

Similarly, it should be appreciated that in the description of example embodiments of the disclosure, various features of the disclosure are sometimes grouped together in a single embodiment, figure, or description thereof for the purpose of streamlining the disclosure and aiding in the understanding of one or more of the various aspects of the disclosure. This method of disclosure, however, is not to be interpreted as reflecting an intention that the claims require more features than are expressly recited in each claim. Rather, as the following claims reflect, the claims can include less than all features of a single foregoing disclosed embodiment. Thus, the claims following the detailed description are hereby expressly incorporated into this detailed description, with each claim standing on its own as a separate embodiment of this disclosure.

Furthermore, while some embodiments described herein include some but not other features included in other embodiments, combinations of features of different embodiments are meant to be within the scope of the present disclosure, and form different embodiments, as would be understood by those in the art. For example, in the following claims, any of the claimed embodiments can be used in any combination.

In the description provided herein, numerous specific details are set forth. However, it is understood that embodiments of the present disclosure may be practiced without these specific details. In other instances, well-known methods, structures, and techniques have not been shown in detail in order to not obscure an understanding of this description.

In a first aspect, the present disclosure relates to an integrated photonic device. This device comprises an image detector comprising an array of pixels, an integrated waveguide and a light coupler for coupling light from the integrated waveguide toward the image detector. A light receiving part of the light coupler is optically coupled to the integrated waveguide, for receiving a light signal. The light coupler is adapted for coupling a same predetermined band, e.g., a same spectral component, of the light signal to each of a plurality of pixels of the image detector. Furthermore, the light coupler may have a length that is at least two times the pixel pitch of the detector, e.g., at least three times the pixel pitch, e.g., at least four times the pixel pitch, such as at least five times the pixel pitch.

Figure 1:
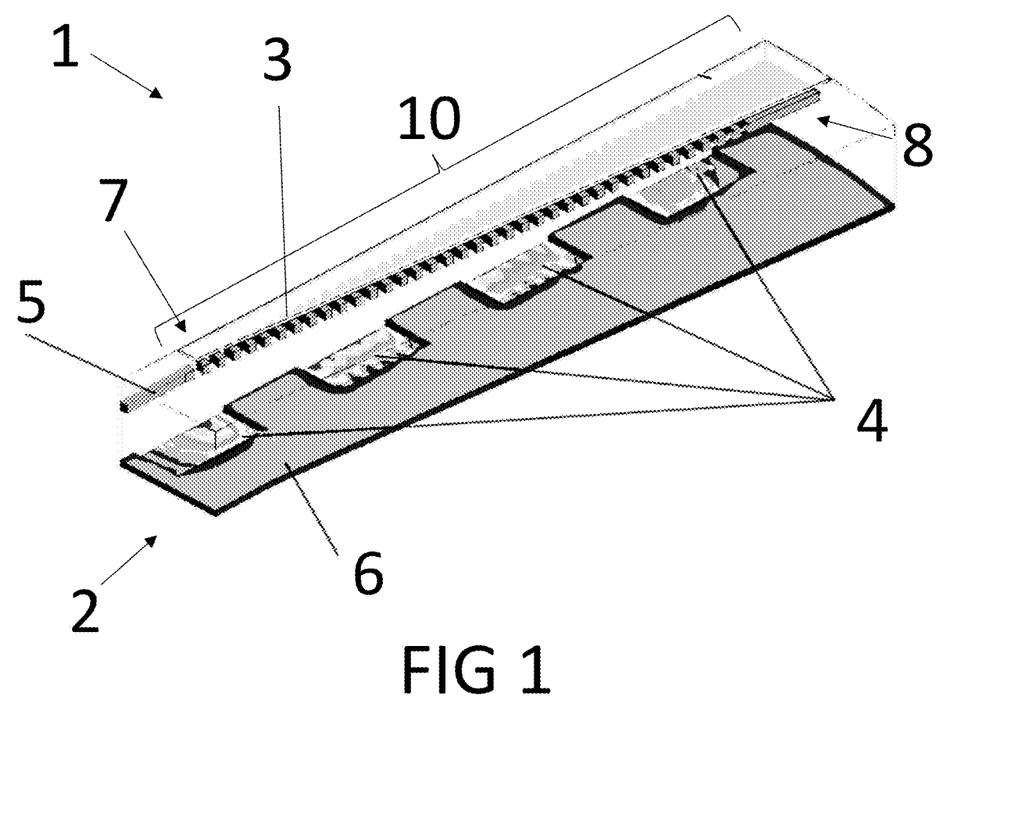
FIG. 1 shows an integrated photonic device in accordance with embodiments of the present disclosure.

An example of such integrated photonic device 1 in accordance with embodiments of the present disclosure is shown in FIG. 1. For example, the integrated photonic device 1 may form part of, e.g., may be integrated in, an integrated spectrometer, e.g., a Fourier transform spectrometer, e.g., a FTIR spectrometer, embodiments of the present disclosure not being limited to such applications. For example, embodiments of the present disclosure may also relate to a spectrometer comprising an integrated photonic device 1 in accordance with embodiments of the disclosure.

This device 1 comprises an image detector 2 comprising an array of pixels. For example, the image detector 2 may comprise an array of detector pixels, e.g., disposed in a plane substantially parallel to the waveguide, e.g., parallel to the waveguide and/or the light coupler. The image detector 2 may comprise a one-dimensionally or two-dimensionally configured grid formed by a plurality of pixels, e.g., each pixel having an active pixel area 4 sensitive to light. Thus the array of pixels may comprise a one-dimensional or two-dimensional grid of detector pixels. However, the image detector 2 may also comprise an area 6, e.g., formed by imager contacts, such as aluminum contacts, that is insensitive to light. For example, each detector pixel may be adapted for transducing an amount of light incident on the active area 4 into an output signal, e.g., an electrical signal, in which the output signal is substantially independent of the amount of light that impinged on the area 6 that is insensitive to light.

The device 1 further comprises an integrated waveguide 5. The integrated photonic device 1 may also comprise a substrate. For example, the integrated waveguide 5 may be provided in or on the substrate, e.g., directly on or indirectly on the substrate. The integrated waveguide 5 may be adapted for conducting light. The integrated waveguide 5 may be formed in at least one layer, e.g., a layer of dielectric material, e.g., a plurality of layers forming a waveguide core and a waveguide cladding. The integrated waveguide 5, may comprise, for example, a single mode waveguide.

The device 1 also comprises a light coupler 3, e.g., for coupling light from the integrated waveguide 5 toward the image detector 2.

For example, the light coupler 3 may comprise a diffraction grating. Such a diffraction grating may be adapted for diffracting light propagating in the light coupler 3, e.g., a predetermined spectral band of the light signal, e.g., a predetermined spectral component of the light signal, downward and/or upward, e.g., substantially perpendicular to the plane of the light coupler 3. For example, the diffraction grating may comprise periodic lines in a light guiding portion of the coupler 3, e.g., etched into a light guiding portion of the coupler 3. This light may then impinge on the image detector 2, e.g., when the image detector 2 is arranged underneath and/or above the coupler 3.

The diffraction grating may provide a periodic variation of the refractive index in a direction of propagation, e.g., a direction of intended light propagation from the light receiving part 7 to an end part 8, such as to direct at least one predetermined wavelength of light, e.g., light in the predetermined spectral band, toward the image detector 2. For example, the diffraction grating may comprise a plurality of grating lines.

The diffraction grating may be configured to confine at least a portion of the light signal while out-coupling at least another portion of the light signal, e.g., while out-coupling light in the predetermined spectral band. For example, the diffraction grating may comprise a plurality of grating lines adapted for allowing transmission of unselected wavelengths along the direction of propagation toward the end region, while the diffraction grating may be configured, e.g., by a suitable design of grating line spacing, line geometry, refractive properties, and/or light coupler geometry, to couple the selected wavelength or selected wavelengths toward a pixel of the image detector 2 that corresponds to the diffraction grating, or, at least, a fraction of the optical power in this selected wavelength(s) as determined by coupling efficiency of the grating.

The light coupler 3 comprises a light receiving part 7, optically coupled to the integrated waveguide 5, for receiving a light signal supplied via the integrated waveguide 5. Furthermore, the light coupler 3 may comprise an end part 8 at an end of the light coupler 3 opposite of the light receiving part 7.

For example, the light coupler 3 may be adapted for guiding at least a spectral part of the light signal from the light receiving part 7 to the end part 8, when such light signal is received from the integrated waveguide 5 at the light receiving part 7. Thus a direction of propagation may extend from the light receiving part 7 of the light coupler 3 to an end part 8 of the light coupler 3, e.g., along a principal direction of intended light propagation of the light signal after being transmitted into the light coupler 3 by the integrated waveguide 5. For example, the light coupler 3 may be adapted for, e.g., configured to, guide light propagating along such direction of propagation.

For example, the light coupler 3 may be integrally formed in an end region of the waveguide 5, such that the light coupler 3 comprises a part of the waveguide 5 between the light receiving part 7 and the end part 8.

The light coupler 3 may comprise a tapered portion 10. For example, the light coupler 3 may taper outward in the direction of propagation. The light coupler 3 may comprise a tapered portion 10 in which a width of at least a light guiding portion of the light coupler 3 increases from the light receiving part 7 toward the end part 8, e.g., increases monotonously. Thus, the light coupler 3 may comprise a tapered portion 10 in which a width and/or height of the light coupler 3 increases from the light receiving part 7 toward the end part 8, e.g., increases monotonously.

This light coupler 3 is adapted for coupling a same predetermined spectral band, e.g., a predetermined spectral component, of the light signal to each of a plurality of pixels of the image detector 2, e.g., into free space in a direction such as to impinge on each of the plurality of pixels. This plurality of pixels is not necessarily limited to all pixels of the image detector 2, in accordance with embodiments of the present disclosure.

For example, the light coupler 3 may be adapted for coupling light of substantially the same spectral composition to each of the plurality of pixels, e.g., such that each of the pixels can receive light having substantially the same spectral content and, hence, can measure an intensity of the received light. This allows a combination of the measured results, e.g., by averaging or determining a similar measure of statistical centrality, to obtain a robust combination result, e.g., a scalar result, that conveys information about the predetermined spectral band.

The predetermined spectral band may be narrow, e.g., have a spectral bandwidth in the range of 1 nm to 200 nm, e.g., in the range of 5 nm to 150 nm, e.g., in the range of 10 nm to 100 nm, e.g., in the range of 20 nm to 50 nm. The predetermined spectral band may be broad, e.g., have a spectral bandwidth in the range of 100 nm to 500 nm, e.g., in the range of 150 nm to 400 nm, e.g., in the range of 200 nm to 300 nm. Furthermore, the predetermined spectral band may comprise a single predetermined band or a plurality of different predetermined bands.

For example, a single predetermined spectral component is selectively coupled out by the light coupler 3 to impinge on a predetermined plurality of pixels, e.g., forming a predetermined row or a predetermined contiguous part of a row of pixels.

The light coupler 3 may be arranged above (or below) an imaging plane of the image detector 2, e.g., the light coupler may be located parallel with the imaging plane and offset by a distance, e.g., spaced away from the image detector 2 by a spacer. The light coupler 3 may be adapted for directing the predetermined spectral band toward the plurality of pixels, e.g., the predetermined plurality of pixels, in a substantially perpendicular direction with respect to the imaging plane.

The light coupler 3 furthermore may have a length that is at least two times the pixel pitch of the detector 2, e.g., a length that is equal to or exceeds the length of at least two pixels of the array of pixels. Particularly, the light coupler 3 may have a length that is in the range of 75% to 125% of the total length of the plurality of pixels, e.g., the predetermined plurality of pixels of the imaging detector 2 to which the same predetermined spectral band is coupled.

Thus, a large fraction of the predetermined spectral band may be coupled to, and distributed over, the plurality of pixels. Since image detectors may have a small pixel pitch, coupling efficiency may be increased by distributing a selected spectral band over the plurality of pixels.

For example, the pixel pitch of the image detector 2 may be substantially smaller than the length of a grating coupler that would be required to achieve an acceptable coupling efficiency. For example, the image detector 2 may have a pixel pitch in the range of 1 μm to 10 μm, e.g., in the range of 3 μm to 7 μm, e.g., a pixel pitch of 5.5 μm may be used. Therefore, in accordance with embodiments of the present disclosure, a grating coupler may couple light into multiple pixels, e.g., into at least two pixels, e.g., into at least two adjacent pixels, such as into each of a block of four adjacent pixels in a row, for example into at least four pixels.

In a device in accordance with embodiments of the present disclosure, the light coupler 3 may comprise a diffraction grating. For example, the diffraction grating may be more than three times the pixel pitch, e.g., 20 µm long, e.g., when the detector has a pixel pitch of 5.5 µm. Since a plurality of pixels are used to collect a substantially identical spectral band of the light signal, e.g., to collect sufficient power, from the same coupler 3, e.g., four pixels in an example such as also depicted in FIG. 1, a light coupler 3 using a diffraction grating may couple, for example, 27% of the light supplied by the entrance waveguide 5 to the four pixels 4.

Figure 2:
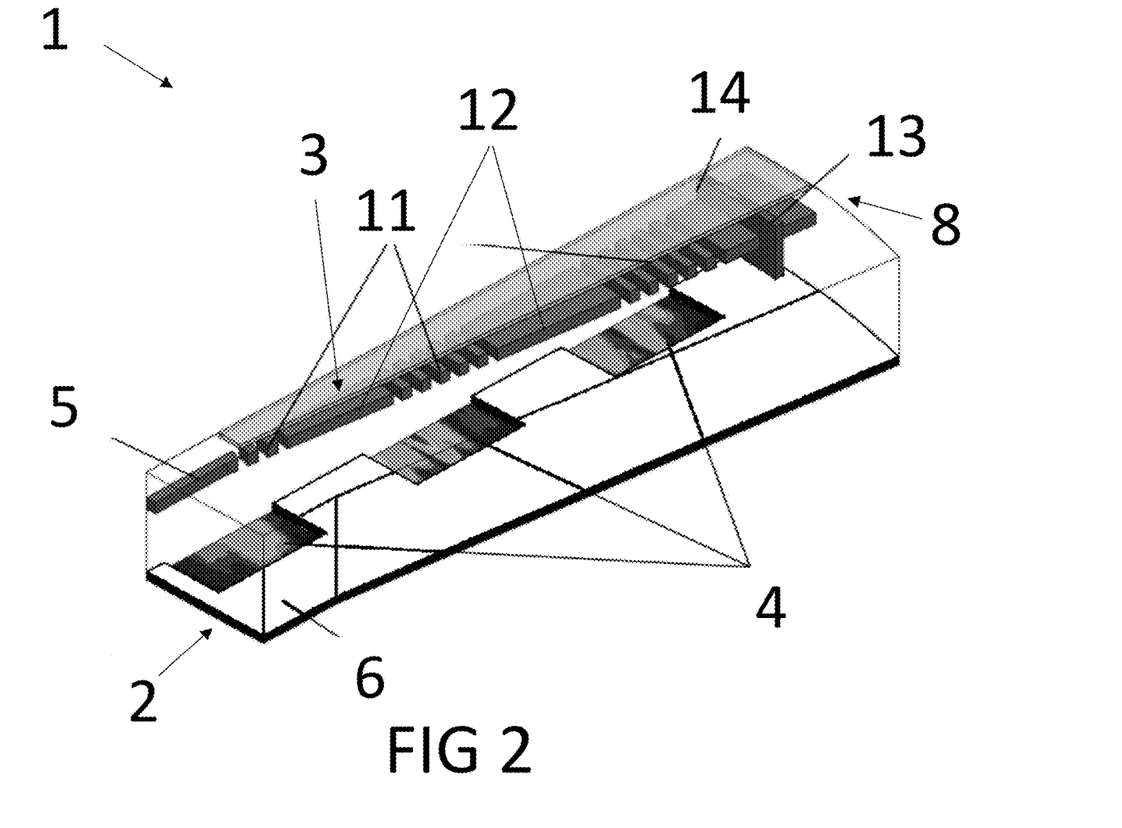
FIG. 2 shows another integrated photonic device in accordance with embodiments of the present disclosure.

Referring to FIG. 2, in a device in accordance with embodiments of the present disclosure, the light coupler 3 may comprise a plurality of diffraction gratings 11 spaced apart by light guiding segments 12, e.g., such that the diffraction gratings and light guiding segments alternate along a direction of propagation extending from the light receiving part 7 of the light coupler 3 to an end part 8 of the light coupler 3, e.g., along a principal direction of intended light propagation of the light signal after being transmitted into the light coupler 3 by the integrated waveguide 5.

The image detector 2 comprises an array of pixels, in which each pixel may have an active pixel area 4 sensitive to light. Furthermore, the image detector 2 may also comprise an area 6, e.g., formed by imager contacts, such as aluminum contacts, that is insensitive to light. Furthermore, this insensitive area 6, or such insensitive areas, may space apart the active pixel areas 4 from each other.

Each diffraction grating 11, e.g., which each may have a feature(s) and/or a characteristic(s) as described hereinabove in relation to the single diffraction grating depicted in FIG. 1, may diffract light in the light coupler 3 downward and/or upward, e.g., substantially perpendicular to the plane of the light coupler 3. For example, each grating may comprise periodic lines, e.g., etched into a light guiding portion of the coupler 3.

In a device according to embodiments, such as shown in FIG. 1, the out-coupled light may impinge on the image detector 2 in a location, irrespective of whether this location corresponds to an active area 4 or not. Therefore, by including the light guiding segments 12 to space apart the diffraction gratings 11, as shown in FIG. 2, the efficiency of the coupling may be further increased by reducing or avoiding a portion of the out-coupled light that would otherwise be wasted by impinging on the insensitive area 6.

Thus, a single diffraction grating, as shown in FIG. 1, for supplying a plurality of pixels with substantially the same spectral band of a light signal, may be divided into a plurality of diffraction gratings 11 separated by light guiding segments 12, e.g., as shown in FIG. 2, in which each diffraction grating is adapted for supplying the active area 4 of a corresponding pixel of the plurality of pixels with substantially the same spectral band of the light signal, e.g., such as to selectively couple to the active area of one pixel.

Particularly, each of the plurality of diffraction gratings 11 may be adapted for directing the same predetermined spectral band out of the light coupler 3 toward the image detector 2, e.g., such as to repeatedly couple out part of a remaining power in that spectral band for improving a total out-coupling efficiency.

Each diffraction grating 11 may be adapted for out-of-plane coupling of a light signal received from the integrated waveguide 5 to a corresponding pixel of the image detector 2. Thus, each pixel of the plurality of pixels, e.g., each pixel having a corresponding diffraction grating 1, may receive substantially the same spectral band.

Thus, the light coupler 3 may comprise discrete light coupling segments, each light coupling segment comprising grating lines that form one of the diffraction gratings, for coupling light selectively to the active area of a single corresponding pixel. In between the pixel active areas, e.g., where contacts of the detector 2 make the pixel insensitive, the light coupler 3 may guide the light to the next light coupling segment without diffracting light out of the waveguide, via a light guiding segment, thus preserving the light for the next light coupling segment and corresponding active pixel area.

A device in accordance with embodiments of the present disclosure may also comprise a reflector 13, e.g., a back-reflector, in the end part 8 of the light coupler 3, for reflecting light propagating along the direction of propagation back along the inverse direction of propagation. Thus, light may de reflected such as to propagate back through the light coupler 3 toward the waveguide 5, and thus may have another opportunity to be coupled out by the light coupler 3 toward the plurality of pixels of the image detector 2, e.g., toward an active area 4 of one of the pixels. This reflector 13 may thus, virtually, be considered to make the grating coupler longer, without the need for extra pixels.

Furthermore, the reflector 13 may prevent light from propagating further along the direction of propagation, e.g., past the end part 8, where it might adversely affect an adjacent photonic component, e.g., an adjacent light coupler.

For example, the reflector 13 may comprise a mirror, e.g., a metallic reflective surface, a distributed Bragg reflector, a dispersive mirror or a waveguide loop mirror. For example, the reflector 13 may comprise a vertical metal back-mirror for reflecting the light that reaches the back of coupler 3 again into the light coupler 3. For example, the reflector 13 may comprise a copper reflector.

A device in accordance with embodiments of the present disclosure may also comprise a reflector 14, e.g., a top-reflector, covering a side of the light coupler 3 opposite of the side to which the image detector 2 is located. Thus, light coupled out of the light coupler 3 in an out-of-plane direction opposite of the direction in which the image detector 2 is arranged is reflected back, such as to increase out-coupling efficiency. For example, the reflector 14 may comprise a layer of titanium nitride, e.g., covering the light coupler 3.

The reflector 14 may be arranged at a distance to the light coupler 3, e.g., at a distance above the light coupler 3, such that reflected light waves can constructively interfere with light that is coupled out of the light coupler 3 in an out-of-plane direction in which the image detector 2 is arranged, e.g., with light that is coupled directly toward the image detector 2 by the light coupler 3. For example, this distance may be selected or tuned by taking a central wavelength of the predetermined spectral band into account, e.g., such that the distance from the reflector 14 to the exit surface of the light coupler 3 that is arranged closest to the image detector 2 corresponds to an integer multiple of this central wavelength. However, embodiments of the present disclosure are not necessarily limited thereto, e.g., refractive indices of different materials in between the image detector 2 and the reflector 14 may be taken into account in determining and/or tuning such distance.

Figure 6:
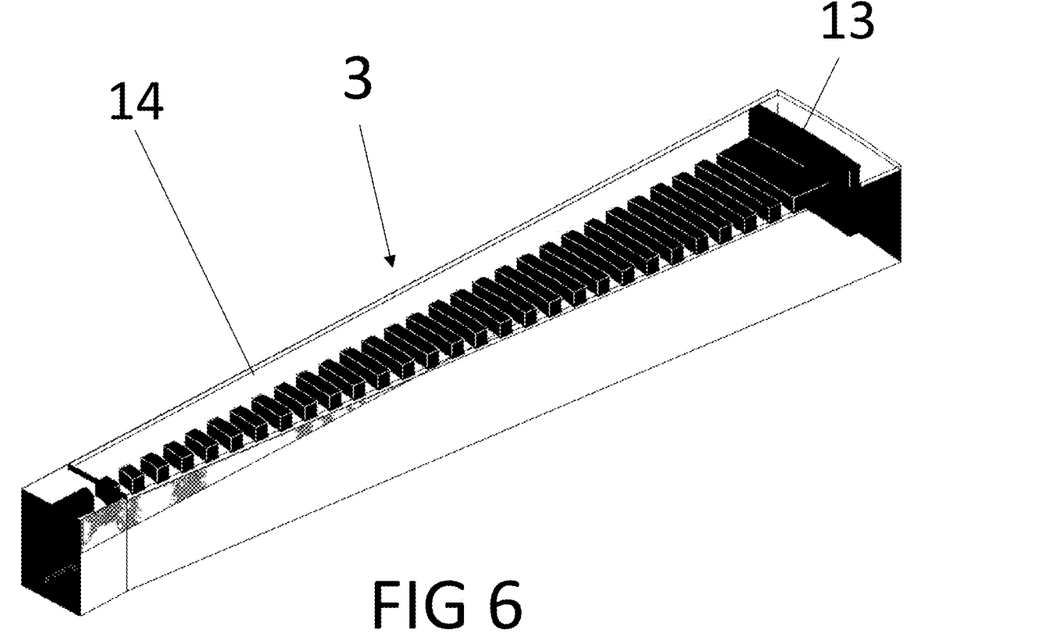
FIG. 6 illustrates a light coupler for use in an integrated photonic device in accordance with embodiments of the present disclosure.
Figure 7:
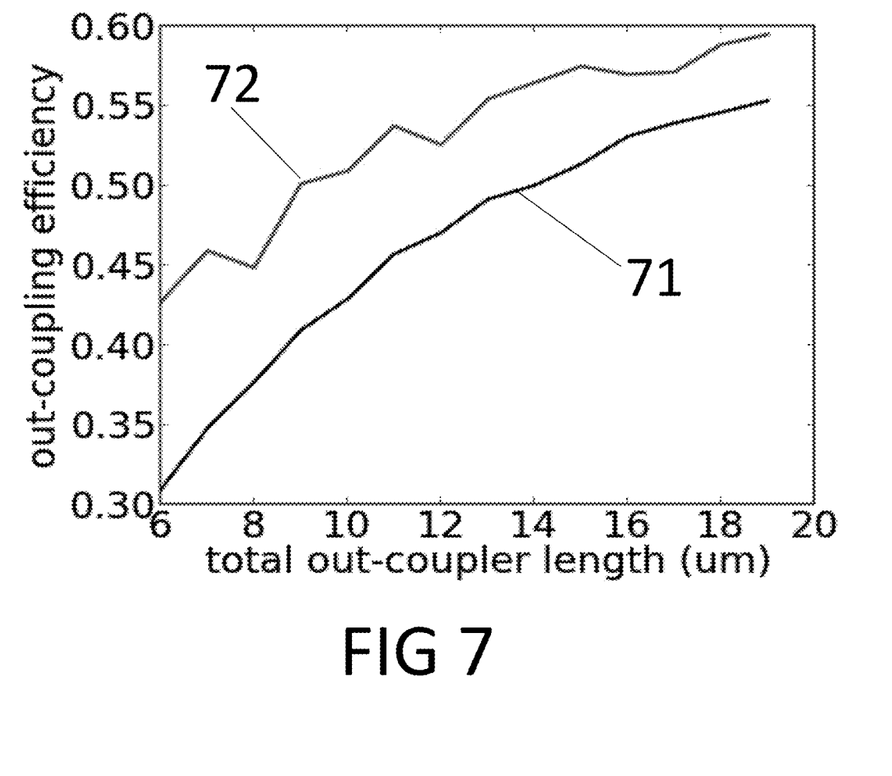
FIG. 7 shows an example comparison of coupling efficiency of two light couplers for use in an integrated photonic device in accordance with embodiments of the present disclosure.

Referring to FIG. 6, another light coupler 3 in accordance with embodiments of the present disclosure is shown, which comprises a top reflector 14 and a back reflector 13, as described hereinabove. This light coupler 3 may be tapered as described hereinabove. The back reflector 13 may furthermore be elliptically shaped. This shape may be particularly efficient in reflecting light back through the light coupler 3. The efficiency may furthermore even increase further for an increasing length of the light coupler 3. This is illustrated by FIG. 7, showing the out-coupling efficiency 72 of the light coupler 3 with elliptically shaped back mirror and the out-coupling efficiency 71 of the same light coupler 3 without back mirror.

Since fewer pixels may be used to collect the same power of a spectral band of the light signal, by a device comprising the light guiding segments 12 such as shown in FIG. 2 as compared to the device shown in FIG. 1, e.g., due to less wasted out-coupled power, the contribution of noise to the signal may be lower, e.g., the same intensity is distributed over three instead of four pixels, in this example. Thus, about 31% of the light in the selected spectral band may be coupled out and distributed over the plurality of pixels, e.g., out-of-plane to the active areas 4 of three pixels of the image detector array, e.g., when combining the light guiding segments 12 with reflectors 13 and 14, improving the signal-to-noise ratio with 30% compared to the design depicted in FIG. 1 due to an increased signal received per pixel and a reduced noise.

An integrated photonic device 1 in accordance with embodiments of the present disclosure may comprise a plurality of integrated waveguides 5 and a plurality of light couplers 3 for coupling light from a corresponding integrated waveguide 5 toward the image detector 2.

In a device in accordance with embodiments of the present disclosure, each such light coupler 3 may, for example, be adapted for coupling a different predetermined spectral band of the light signal. Each light coupler 3 may, however, be adapted for coupling this predetermined spectral band to each of a corresponding plurality of pixels of the image detector 2.

Furthermore, the, e.g., each of the, light couplers 3 may be segmented as described hereinabove in relation to FIG. 2.

Figure 3:
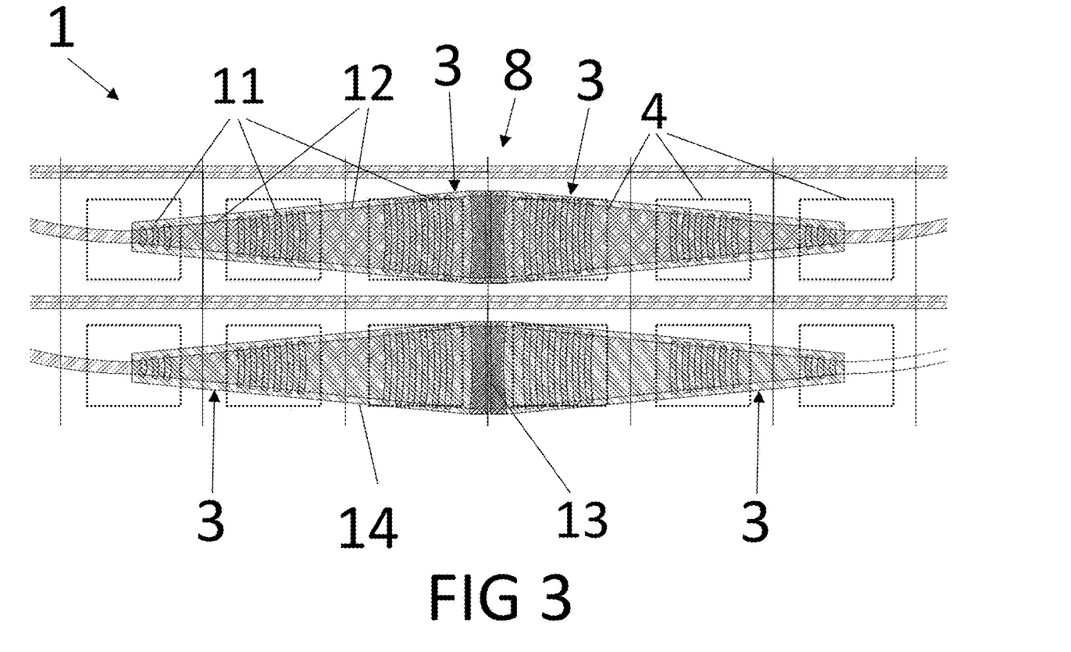
FIG. 3 shows yet another integrated photonic device in accordance with embodiments of the present disclosure.

Referring to FIG. 3, at least one pair of the plurality of light couplers 3 may be arranged such as to have adjacent end parts 8. For example, the light couplers 3 may be arranged back-to-back. The end parts of both light couplers 3 of such pair may comprise a common back reflector 13, e.g., each pair may comprise a single back reflector 13, for reflecting light propagating along the direction of propagation in each of the pair of light couplers 3 back along the inverse direction of propagation. Thus, the back reflector 13, such as a metal reflector, e.g., a vertical copper two-sided back-reflecting mirror, is shared between two light couplers 3.

Figure 4:
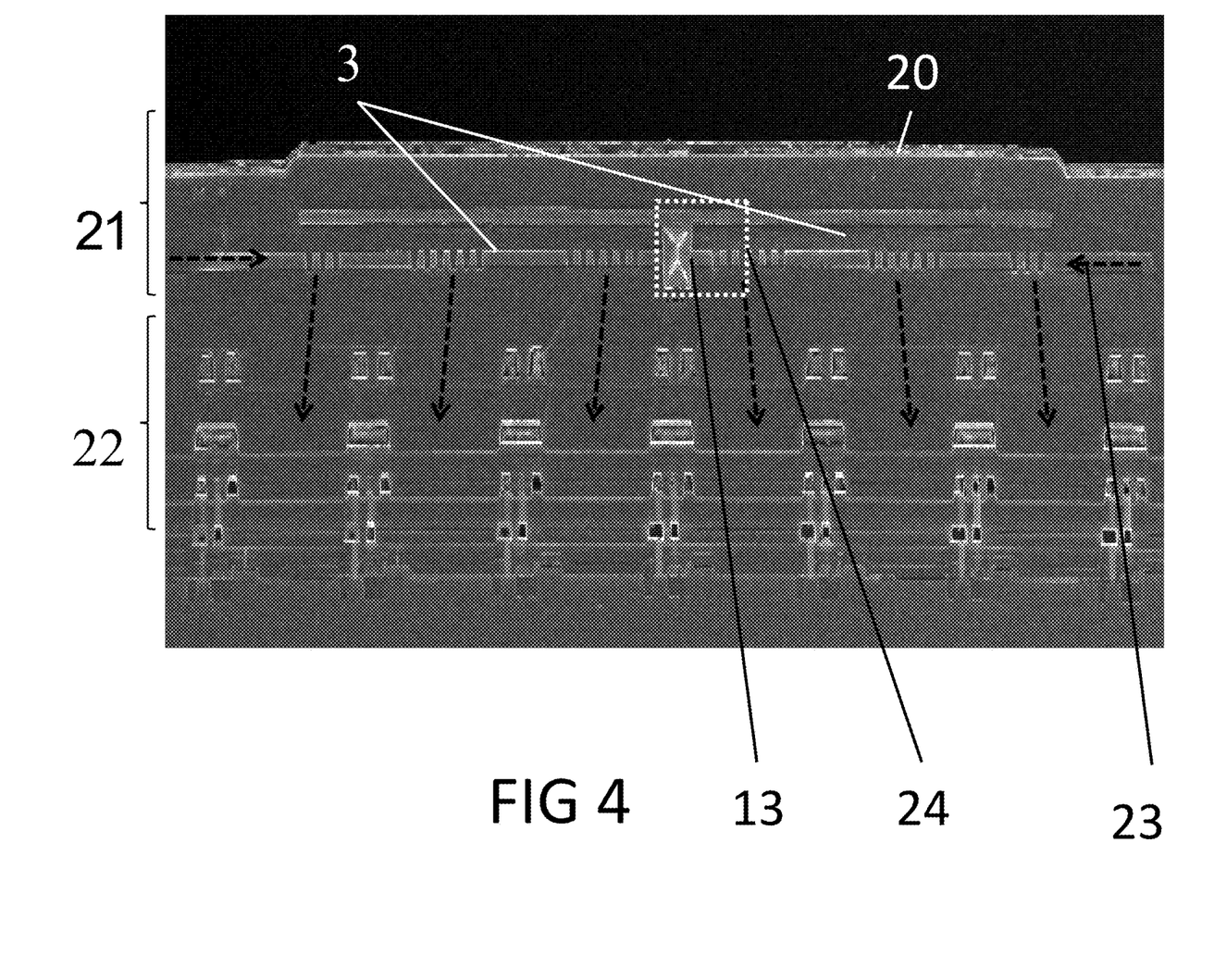
FIG. 4 shows a cross-sectional scan image of an integrated photonic device in accordance with embodiments of the present disclosure.

An example cross-sectional scanning electron micrograph of a device in accordance with embodiments comprising back-to-back light couplers 3, e.g., as described in relation to FIG. 3, is shown in FIG. 4.

Here, the photonics layers 21 can be seen, comprising the light couplers 3, e.g., the segmented grating couplers as described hereinabove. A blocking layer 20 may be provided over the photonics 21, e.g., comprising μl and/or MOCVD TiN, for example for providing the top reflector 14. The back reflector 13 may, for example, be a copper two-sided reflecting mirror.

The diffractive gratings of these light couplers 3, and the light guiding segments spacing these diffractive gratings apart, may be aligned to a pixel grid of the image detector, implemented in the imager layers 22, e.g., a cmv12k imager in this example. It can further be observed that the two light couplers 3 shown in this example are separated in a central region, e.g., where the respective end parts of the light couplers meet, by the back reflector 13. The propagation of light through the system, without showing a back-reflected part in the two grating couplers due to the back reflector 13, is illustrated by the arrows 23.

Figure 5:
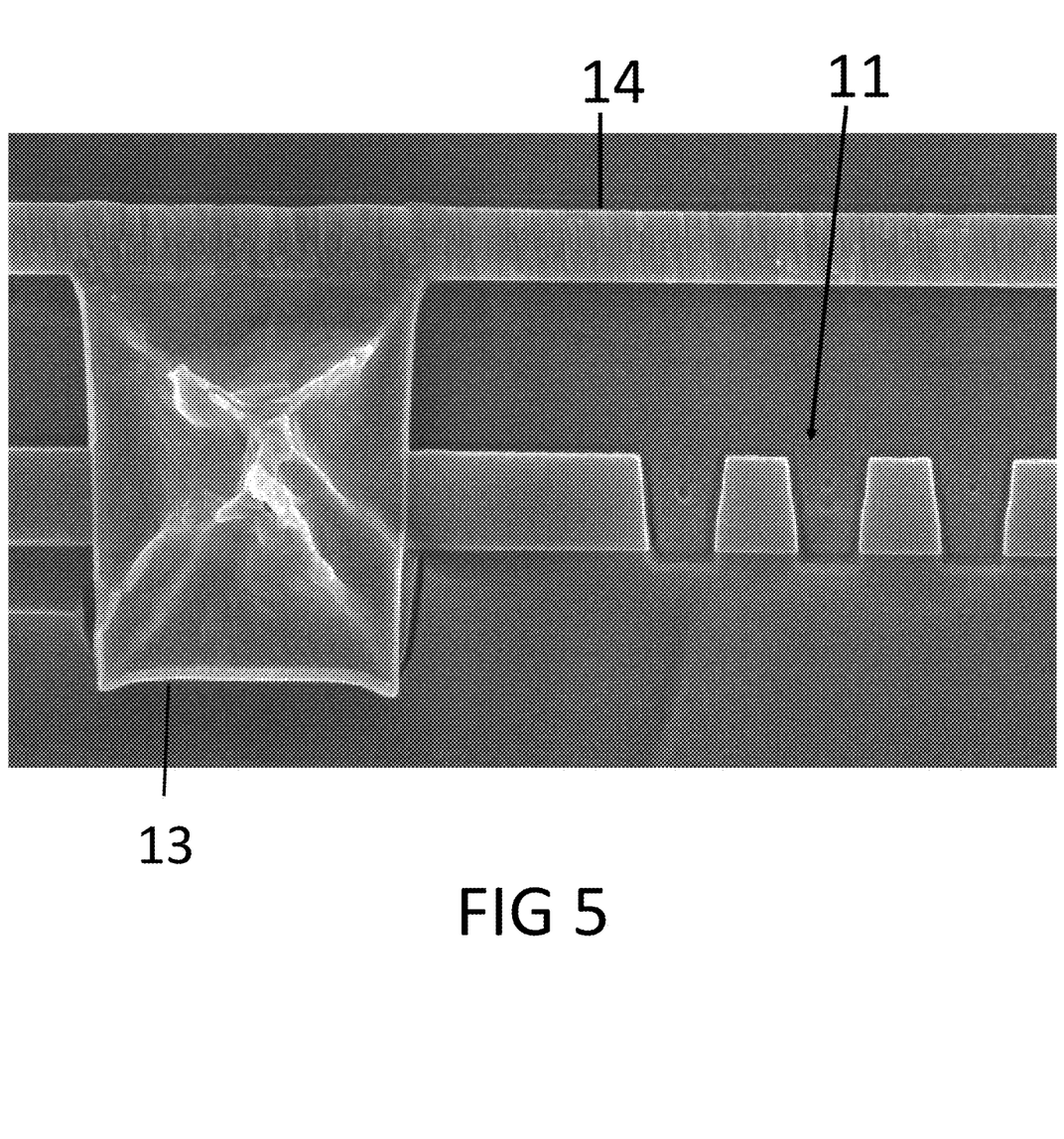
FIG. 5 shows a detailed image of part of the cross-sectional scan image, shown in FIG. 4, of an integrated photonic device in accordance with embodiments of the present disclosure.

The marked region 24 is shown in detail in FIG. 5, illustrating the light wave guiding medium of the light couplers 3, e.g., a $SiO_2/SiN/SiO_2$ material stack. Furthermore, a diffractive grating 11 is partially shown in the light coupler structure.

In another aspect, the present disclosure relates to an integrated circuit spectrometer system. This integrated circuit spectrometer system may comprise an integrated photonic device 1 in accordance with embodiments of the present disclosure. For example, the integrated photonic device 1 may comprise a plurality of integrated waveguides 5 and a plurality of corresponding light couplers 3, as described hereinabove, in which each light coupler 3 couples a corresponding spectral band of a light signal to a corresponding plurality of pixels. Thus the integrated circuit spectrometer system may comprise a processor for combining readout signals from the plurality of pixels corresponding to each light coupler 3. Furthermore, the processor may be adapted for analyzing the plurality of combined readout signals as function of the corresponding spectral band. For example, analyzing, the plurality of combined readout signals may comprise performing a Fourier transform spectrometric analysis method.

In yet another aspect, the present disclosure relates to a method for analyzing a spectral band, e.g., a predetermined spectral component, of a light signal. The method comprises coupling the light signal into an integrated light coupler. The method also comprises, by using the light coupler, diffracting the spectral band of the light signal out of the light coupler, in a plurality of discrete out-coupling regions of the light coupler, toward active areas of a corresponding plurality of pixels of an image detector, while guiding the light signal between each adjacent pair of these out-coupling regions such as to avoid diffracting light out of the light coupler toward light insensitive areas of the image detector.

The invention claimed is:

1. An integrated photonic device comprising:
   an image detector comprising an array of pixels;
   an integrated waveguide; and
   a light coupler comprising a light receiving part optically coupled to the integrated waveguide for receiving a light signal,
   wherein the light coupler is adapted for coupling a same predetermined spectral band of the light signal to each pixel of the array of pixels of the image detector,
   wherein the light coupler comprises a tapered portion in which the light coupler tapers outward in a direction of propagation,
   wherein the light coupler comprises an end part at an end of the light coupler opposite of the light receiving part, such that the direction of propagation extends from the light receiving part to the end part, and
   wherein the end part further comprises an elliptically shaped back reflector for reflecting light propagating along the direction of propagation back through the light coupler toward the integrated waveguide.

2. The integrated photonic device according to claim 1, wherein the light coupler further comprises a diffraction grating.

3. The integrated photonic device according to claim 2, wherein the light coupler further comprises a plurality of diffraction gratings spaced apart by light guiding segments, wherein each diffraction grating is adapted for supplying an active pixel area of a corresponding pixel of the array of pixels with the same predetermined spectral band of the light signal.

4. The integrated photonic device according to claim 3, wherein each of the light guiding segments is adapted for guiding the light signal between an adjacent pair of the diffraction gratings without thereby diffracting light out of the light guiding segment.

5. The integrated photonic device according to claim 1, wherein the light coupler is arranged above an imaging plane of the image detector, and wherein the light coupler is adapted for directing the predetermined spectral band of the light signal toward the array of pixels in a substantially perpendicular direction with respect to the imaging plane.

6. The integrated photonic device according to claim 1, wherein the light coupler has a length that is at least two times a pixel pitch of the image detector.

7. The integrated photonic device according to claim 1, wherein the integrated waveguide and the light coupler are integrated on the image detector.

8. The integrated photonic device according to claim 1, further comprising a top reflector covering a side of the light coupler opposite of a side on which the image detector is located.

9. The integrated photonic device according to claim 1, further comprising a plurality of integrated waveguides and a plurality of light couplers, wherein each light coupler of the plurality of light couplers is adapted for coupling light from a corresponding integrated waveguide toward the image detector, and wherein each light coupler of the plurality of light couplers is adapted for coupling a different predetermined spectral band of the light signal to corresponding pixels of the array of pixels of the image detector.

10. The integrated photonic device according to claim 9, wherein at least one pair of light couplers from the plurality of light couplers is arranged to have adjacent end parts, the pair of light couplers comprising a common back reflector for reflecting light propagating along the direction of propagation in each light coupler of the pair of light couplers in a direction inverse to the direction of propagation.

11. A spectrometer comprising an integrated photonic device, the integrated photonic device comprising:
   an image detector comprising an array of pixels;
   an integrated waveguide; and
   a light coupler comprising a light receiving, part optically coupled to the integrated waveguide for receiving a light signal,
   wherein the light coupler is adapted for coupling a same predetermined spectral band of the light signal to each pixel of the array of pixels of the image detector,
   wherein the light coupler comprises a tapered portion in which the light coupler tapers outward in a direction of propagation,
   wherein the light coupler comprises an end part at an end of the light coupler opposite of the light receiving part, such that the direction of propagation extends from the light receiving part to the end part, and
   wherein the end part further comprises an elliptically shaped back reflector for reflecting light propagating along the direction of propagation back through the light coupler toward the integrated waveguide.

12. A method for analyzing a spectral band of a light signal, the method comprising:
   coupling the light signal into an integrated light coupler, wherein the integrated light coupler comprises (i) a tapered portion, in which the light coupler tapers outward in a direction of propagation, and (ii) an end part comprising an elliptically shaped back reflector for reflecting light propagating along the direction of propagation back through the light coupler; and
   using the light coupler, diffracting the spectral band of the light signal out of the light coupler, in a plurality of discrete out-coupling regions, toward active areas of a corresponding plurality of pixels of an image detector, while guiding the light signal between adjacent pairs of the out-coupling regions so as to avoid diffracting light out of the light coupler toward light insensitive areas of the image detector.

13. The method according to claim 12, wherein the diffracting comprises supplying an active pixel area of a pixel of the plurality of pixels with a same predetermined spectral band of the light signal via a corresponding diffraction grating of a plurality of diffraction gratings of the light coupler, wherein the diffraction gratings are spaced apart by light guiding segments.

14. The method of claim 13, further comprising guiding the light signal between an adjacent pair of the diffraction gratings spaced apart by a respective one of the light guiding segments without thereby diffracting light out of the respective light guiding segment.

15. The method of claim 12, further comprising coupling the light signal into a plurality of integrated waveguides comprising a corresponding plurality of light couplers for coupling light from each integrated waveguide toward the image detector.

16. The method of claim 15, further comprising reflecting light propagating along a direction of propagation in each light coupler of a pair of the light couplers in a direction inverse to the direction of propagation using a common back reflector, the pair of light couplers being arranged to have adjacent end parts, the pair of light couplers comprising a common back reflector forming an elliptically shaped back reflector of each of the light couplers of the pair.

17. The method of claim 12, wherein the light coupler is arranged above an imaging plane of the image detector, and wherein the diffracting comprises directing the spectral band of the light signal toward the active areas of the corresponding plurality of pixels in a substantially perpendicular direction with respect to the imaging plane.

18. The method of claim 12, further comprising providing a top reflector covering a side of the light coupler opposite of a side on which the image detector is located, wherein the diffracting further comprises diffracting light out of the light coupler in a direction away from the image detector, and wherein the method further comprises using the top reflector to reflect the light diffracted in the direction away from the image detector in a reflected direction back toward the light coupler.

19. The integrated photonic device according to claim 8, wherein the top reflector is adapted for reflecting, in a reflected direction back toward the light coupler, light that has been diffracted out of the light coupler and away from the image detector.

20. The integrated photonic device according to claim 19, wherein the top reflector is separated from the light coupler at a distance such that the light reflected by the top reflector constructively interferes with the predetermined spectral band of the light signal coupled to each pixel of the array of pixels of the image detector.

* * * * *